United States Patent
Hasegawa et al.

(10) Patent No.: US 12,014,516 B2
(45) Date of Patent: Jun. 18, 2024

(54) INFORMATION INTEGRATION METHOD, INFORMATION INTEGRATION DEVICE, AND INFORMATION INTEGRATION PROGRAM

(71) Applicant: Nippon Telegraph and Telephone Corporation, Tokyo (JP)

(72) Inventors: Keisuke Hasegawa, Tokyo (JP); Masato Ono, Tokyo (JP); Koji Namba, Tokyo (JP); Takahide Hoshide, Tokyo (JP); Tetsuya Yamaguchi, Tokyo (JP); Akira Ono, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 508 days.

(21) Appl. No.: 17/280,264

(22) PCT Filed: Sep. 13, 2019

(86) PCT No.: PCT/JP2019/036127
§ 371 (c)(1),
(2) Date: Mar. 26, 2021

(87) PCT Pub. No.: WO2020/066699
PCT Pub. Date: Apr. 2, 2020

(65) Prior Publication Data
US 2022/0114749 A1   Apr. 14, 2022

(30) Foreign Application Priority Data
Sep. 28, 2018   (JP) .................. 2018-185037

(51) Int. Cl.
*G06T 7/73* (2017.01)
*G06T 3/4038* (2024.01)
(Continued)

(52) U.S. Cl.
CPC .............. *G06T 7/73* (2017.01); *G06T 3/4038* (2013.01); *G06T 7/536* (2017.01); *G06V 10/25* (2022.01); *G06T 2207/10032* (2013.01)

(58) Field of Classification Search
CPC ......... G06T 2207/10032; G06T 3/4038; G06T 7/536; G06T 7/73; G06V 10/25; H04N 21/816
See application file for complete search history.

(56) References Cited

U.S. PATENT DOCUMENTS

| | | | |
|---|---|---|---|
| 2006/0049933 A1* | 3/2006 | Kelley | G08B 13/19628 340/539.13 |
| 2014/0253667 A1* | 9/2014 | Tian | H04N 23/698 348/14.07 |
| 2020/0174113 A1* | 6/2020 | Lee | G01S 13/87 |

OTHER PUBLICATIONS

Ishii et al., "Kirari! Tracker: Human Detection and Tracking System by Using LiDAR and Deep Learning Engine," Video Information Media Society, Winter Games, 2017, 5 pages (with English Translation).

(Continued)

*Primary Examiner* — Manuchehr Rahmjoo
(74) *Attorney, Agent, or Firm* — Fish & Richardson P.C.

(57) ABSTRACT

An influence on object expression performed at a transmission destination is reduced. A position information reception unit 11 of an information integration device 1 receives, regarding objects which are measured by a plurality of sensors from a plurality of locations and overlap in any of the locations, position information for each location on areas of the objects. A position information integration unit 13 calculates smallest rectangles or largest rectangles surrounding the objects by using the position information for each location.

9 Claims, 14 Drawing Sheets

(51) Int. Cl.
  *G06T 7/536*    (2017.01)
  *G06V 10/25*    (2022.01)

(56) References Cited

OTHER PUBLICATIONS

Kakinuma et al., "Real-time Image Segmentation using Machine Learning Techniques for 4K Video," Video Information Media Society, Winter Games, 2017, 5 pages (with English Translation).

* cited by examiner

Fig. 13
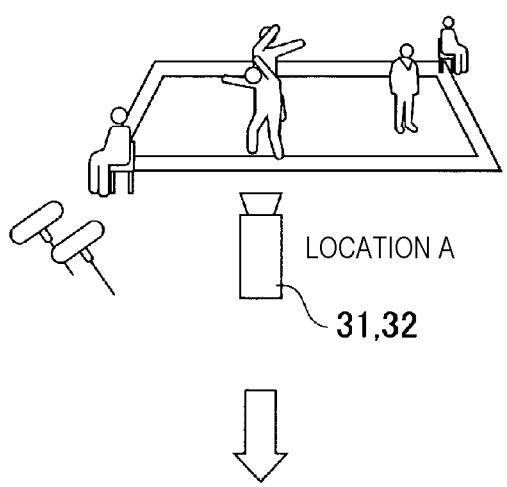
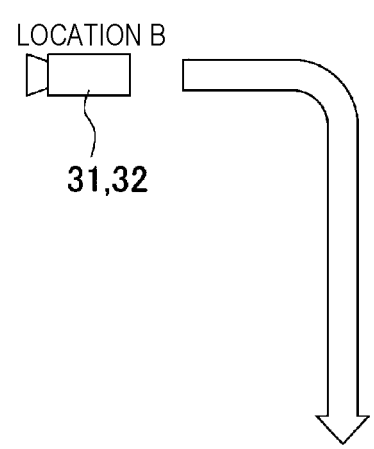
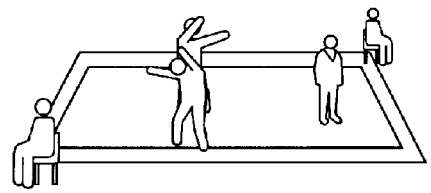
VIEWED FROM LOCATION A
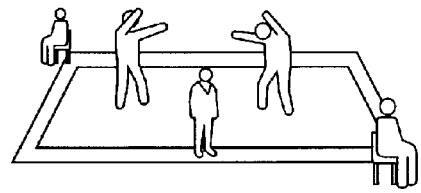
VIEWED FROM LOCATION B

INFORMATION INTEGRATION METHOD, INFORMATION INTEGRATION DEVICE, AND INFORMATION INTEGRATION PROGRAM

CROSS-REFERENCE TO RELATED APPLICATIONS

This application is a National Stage application under 35 U.S.C. § 371 of International Application No. PCT/JP2019/036127, having an International Filing Date of Sep. 13, 2019, which claims priority to Japanese Application Serial No. 2018-185037, filed on Sep. 28, 2018. The disclosure of the prior application is considered part of the disclosure of this application, and is incorporated in its entirety into this application.

TECHNICAL FIELD

The present invention relates to a technique for integrating position information of an object transmitted from space to space and particularly to a technique for obtaining a rectangle indicating an object area where occlusion occurs.

BACKGROUND ART

Currently, real-time transmission techniques for the entire competition space are under research and development. In such techniques, a plurality of pieces of sensor information acquired at a local venue are integrated and processed in real time according to the use application, and the information is transmitted in synchronization with video and audio acquired at the venue.

FIG. 12 is a diagram illustrating an overall image of one example of a system which realizes the technique. A transmission device 100 receives sensor information from a depth-of-field measuring sensor 31 and a position information tracking sensor 32 of a competition venue and acquires three-dimensional position information of an object as a subject to perform an integration or the like, and receives media information from an imaging device 33 and the sound collection device 34 of the same venue and synchronizes three-dimensional position information of the object and the media information on the basis of time information (timestamp) to distribute the information to a video control device 51 and an audio control device 52 of a remote venue.

For example, the video control device 51 outputs the video data of the media information to a naked eye 3D display screen 53 to display the data on a virtual image display panel 54 and controls the position and size of a video material by using the three-dimensional position information of the object. For example, the audio control device 52 outputs the audio data of the media information to each of wavefront synthesis speaker arrays 55 and 56 for competition sound and for cheer sound and controls the position of the audio material by using the three-dimensional position information of the object.

The technique makes it possible to control the position and size of the video material and the audio material to be reproduced in the remote venue according to the movement of the object of the competition venue; for example, to process and convert the object in real time according to the use application. Accordingly, various reproduction expressions such as depth expression and sound image localization can be achieved synchronously in time and space with a high sense of reality.

CITATION LIST

Non-Patent Literature

Non-Patent Literature 1: Kakinuma et al., "4K real-time subject extraction framework using machine learning", Video Information Media Society, Winter Annual Convention, 2017, 15B-2

Non-Patent Literature 2: Ishii et al., "Kirari!Tracker: study of real-time specific person tracking system using Lidar and deep learning engine", Video Information Media Society, Winter Annual Convention, 2017, 15B-3

SUMMARY OF THE INVENTION

Technical Problem

The depth-of-field measuring sensor 31 and the position information tracking sensor 32 usually measure the object from only one viewpoint. However, in a case where the object is measured from only one viewpoint, the content of the sensor information to be measured is not sufficient. Thus, the accuracy of the position information of the object deteriorates, it is difficult to properly control the position and size of the video material and the audio material, and the expression of the object controlled by the video control device 51 and the audio control device 52 is affected.

For example, as illustrated in FIG. 13, two players appear to overlap when viewed from a location A, but the two players appear independently when viewed from a location B. Thus, when occlusion occurs, the objects appearing to overlap cannot be discriminated, and it is difficult to express the object hidden behind. Further, as illustrated in the lower right view in FIG. 14, as compared with the lower left view, in a case where the accuracy of a rectangle representing the position information of the object is not sufficiently obtained, the depth expression of the object is corrupted. For example, when the rectangle includes many areas that are not belonged to a person, depth expression processing is performed including such excess portions while recognizing them as the person, and fails to give a feeling such that the person is grounded on the floor surface, or the like.

An object of the present invention, which has been made in consideration of the above situation, is to reduce an influence on object expression performed at a transmission destination.

Means for Solving the Problem

An information integration method of the present invention is performed by a transmission device for synchronously transmitting media information and sensor information on an object in a first space to a second space. An information integration device performs a first step of receiving, regarding objects which are measured by a plurality of sensors from a plurality of locations and overlap in any of the locations, position information for each location on areas of the objects, and a second step of calculating smallest rectangles or largest rectangles surrounding the objects as rectangles surrounding the objects by using the position information for each location.

In the information integration method, in the second step, in a case where the smallest rectangle is calculated, a position coordinate for each location of the area of the object in a shared coordinate system is calculated, and a rectangle in which a minimum value of values excluding a minimum value among a plurality of maximum values of the area of the object for each location is set as a maximum value of the object, and a maximum value of values excluding a maximum value among a plurality of minimum values of the area of the object for each location is set as a minimum value of the object in coordinates of a predetermined axis is calculated as a rectangle surrounding the object.

In the information integration method, in the second step, the largest rectangle is calculated as a rectangle surrounding the object in a case where there is a conflict in a magnitude relation between the obtained maximum value and minimum value of the object.

In the information integration method, the plurality of locations include a location viewing the object in a bird's-eye perspective.

An information integration device of the present invention is included in a transmission device for synchronously transmitting media information and sensor information on an object in a first space to a second space. The device includes: a position information reception unit which receives, regarding objects which are measured by a plurality of sensors from a plurality of locations and overlap in any of the locations, position information for each location on areas of the objects; and a position information integration unit which calculates smallest rectangles or largest rectangles surrounding the objects as rectangles surrounding the objects by using the position information for each location.

An information integration program of the present invention causes a computer to execute the information integration method.

Effects of the Invention

According to the invention, it is possible to reduce the influence on the object expression performed at the transmission destination.

BRIEF DESCRIPTION OF DRAWINGS

FIG. 13 is a reference diagram for explaining a problem.

DESCRIPTION OF EMBODIMENTS

Hereinafter, one embodiment for implementing the present invention will be described by using the drawings.

<Configuration of Transmission Device>

Figure 1:
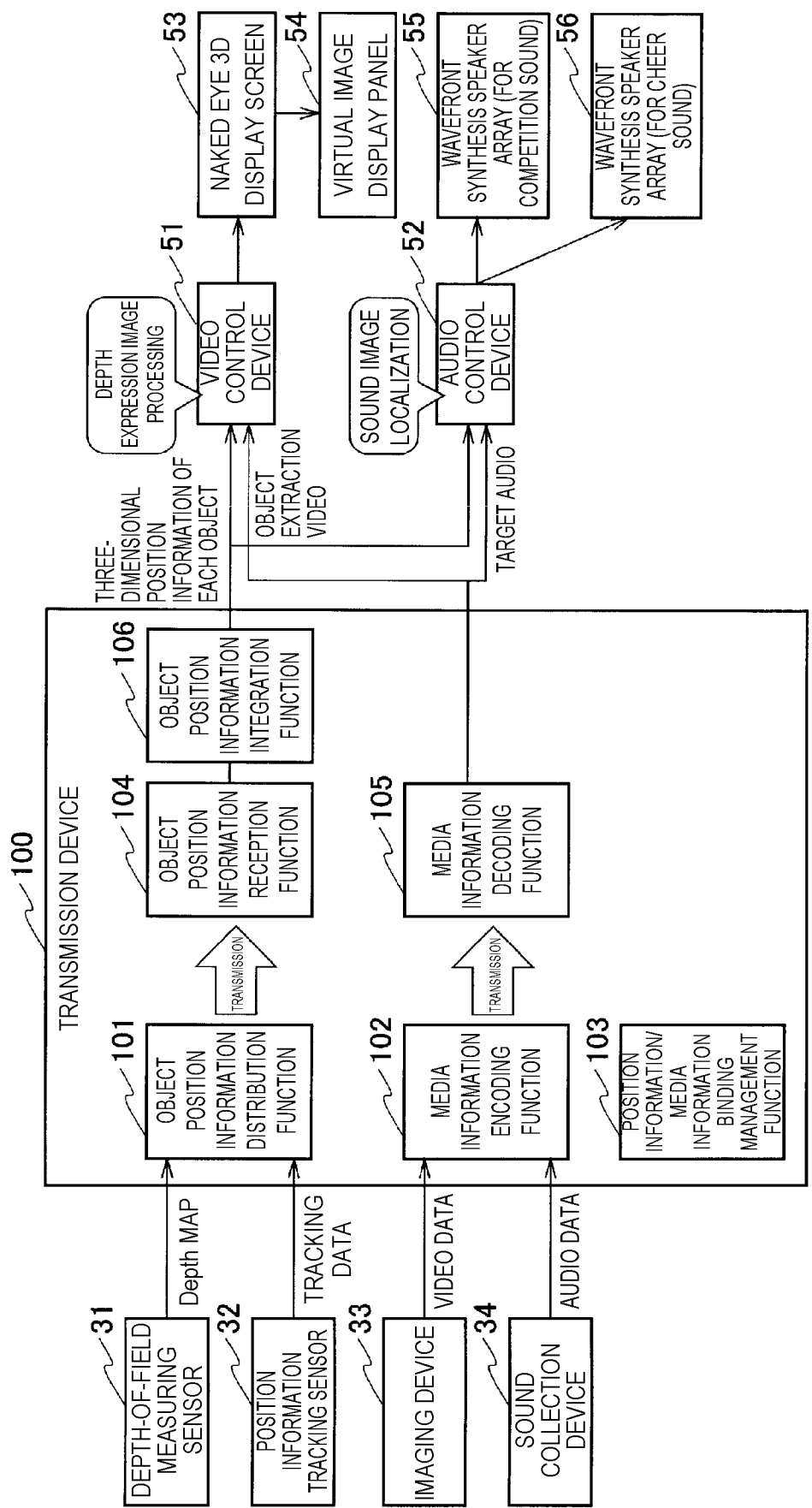
FIG. 1 is a diagram illustrating a functional example of a transmission device.

First, the configuration of the transmission device is described. FIG. 1 is a diagram illustrating an example of a function of a transmission device 100. The transmission device 100 is a device for synchronously transmitting sensor information on an object in a competition venue (a first space) and media information to a remote venue (a second space).

The transmission device 100 is configured by a reception side for receiving the sensor information and the media information from the competition venue and a distribution side for distributing three-dimensional position information, which is obtained on the basis of the sensor information, for each object and the media information to the remote venue. The reception side and the distribution side are connected by a transmission line to be able to communicate with each other.

As illustrated in FIG. 1, the reception side is configured by an object position information distribution function 101, a media information encoding function 102, and a position information/media information binding management function 103.

The object position information distribution function 101 has a function of receiving position information obtained by a plurality of sensors, integrating the position information to generate position information that makes a three-dimensional position of a subject identifiable, and transmitting the position information to the distribution side. For example, the position information obtained by the plurality of sensors is depthwise position data (for example, a Depth map) of the subject obtained the depth-of-field measuring sensor 31 and two-dimensional positional information (tracking data) of the subject obtained by the position information tracking sensor 32.

The Depth map is data obtained by segmenting only an object area and masking the area except the object area. Further, the Depth map is a magnitude of deviation for each pixel between images obtained by imaging with a stereo camera, and parallax information is converted into distance information by a triangulation method. The Depth map is also called a parallax map and corresponds to the distance information. In Non-Patent Literature 1, a method for extracting the subject using machine learning is described, and in this case, a result obtained by calculating the parallax and depth between the subject and the camera is obtained as a Depth map.

The tracking data is position information of a label and an object associated with the label. The label is used to identify the object and is utilized to identify a sound source and to associate the object with a profile. In Non-Patent Literature 2, a method for tracking an object using LiDAR and a deep learning engine is described, and the three-dimensional position of the subject is represented in rectangular form.

The media information encoding function 102 has a function of receiving the media information output by the imaging device 33 and the sound collection device 34, performing an encoding process on each of the video data and the audio data of the media information, and transmitting the result to the distribution side.

The position information/media information binding management function 103 has a function for managing the position information of the object processed by the object position information distribution function 101 in association with the media information processed by the media information encoding function 102 on the basis of the time information.

As illustrated in FIG. 1, the distribution side is configured by an object position information reception function 104, a media information decoding function 105, and an object position information integration function 106.

The object position information reception function 104 has a function of receiving and holding the position information transmitted from the object position information distribution function 101 and distributing the held position information in response to a position information acquisition request from the video control device 51 or the audio control device 52. As a distribution method, for example, push distribution by a Websocket interface and distribution accompanied by buffering by a MIDI interface are used. The object position information reception function 104 receives designation of a frame rate at the time of receiving the position information acquisition request, converts the position information requested for each connection into the designated frame rate, and distributes the result.

The media information decoding function 105 has a function of receiving the media information transmitted from the media information encoding function 102 and distributing the media information to the video control device 51 and the audio control device 52.

The object position information integration function 106 has a function of managing position information of a plurality of viewpoints obtained by measuring the object from a plurality of directions in association with time information, generating and holding highly accurate position information by combining the position information of the plurality of viewpoints, and distributing the held highly accurate position information in response to the position information acquisition request from the video control device 51 or the audio control device 52. A connection interface used by the object position information integration function 106 is the same as that of the object position information reception function 104 and corresponds to a Websocket interface, a MIDI interface, and the like.

The above description is an example of the function of the transmission device 100. When attention is paid to sensor information, the transmission device 100 operates as follows. For example, in a case where four sets of the depth-of-field measuring sensor 31 and the position information tracking sensor 32 are prepared and arranged in east, west, south, and north of the competition venue, the object position information distribution function 101 receives and transmits the sensor information obtained by the measurement of each of the four sets. The object position information reception function 104 receives and holds the position information of the object for each set and distributes the position information in response to the position information acquisition request. The object position information integration function 106 generates highly accurate position information by combining each set of position information and distributes the position information in response to the position information acquisition request.

SUMMARY OF INVENTION

In this embodiment, in order to solve the problem of the present invention, the depth-of-field measuring sensor 31 and the position information tracking sensor 32 (hereinafter, referred to as a sensor) are arranged at different positions in a competition space, the position of the identical object is measured by each sensor, and sensor information from each sensor is combined to calculate a rectangle for properly expressing the position of the object area. In other words, by compensating for the missing position information at each viewpoint (angle) or deleting the unnecessary position information, the influence on the expression of the object controlled by the video control device 51 and the audio control device 52 is reduced.

Specifically, as an occlusion consideration mode (first method) considering a case where the objects overlap, the narrowest rectangle of the object is calculated from the width and depth information of the object from each location. Whether to execute the first method can be designated by a previously prepared setting file. Further, as an occlusion non-consideration mode (second method) considering a case where the objects do not overlap, the largest rectangle surrounded by the rectangle of each location is calculated. Further, in a case where the execution of the first method is not appropriate, such as a case where the sensor information is insufficient, a case where there is a conflict in the data obtained by the first method, or a case where the first method is not executed, the second method is executed (third method).

<Configuration of Information Integration Device>

Figure 2:
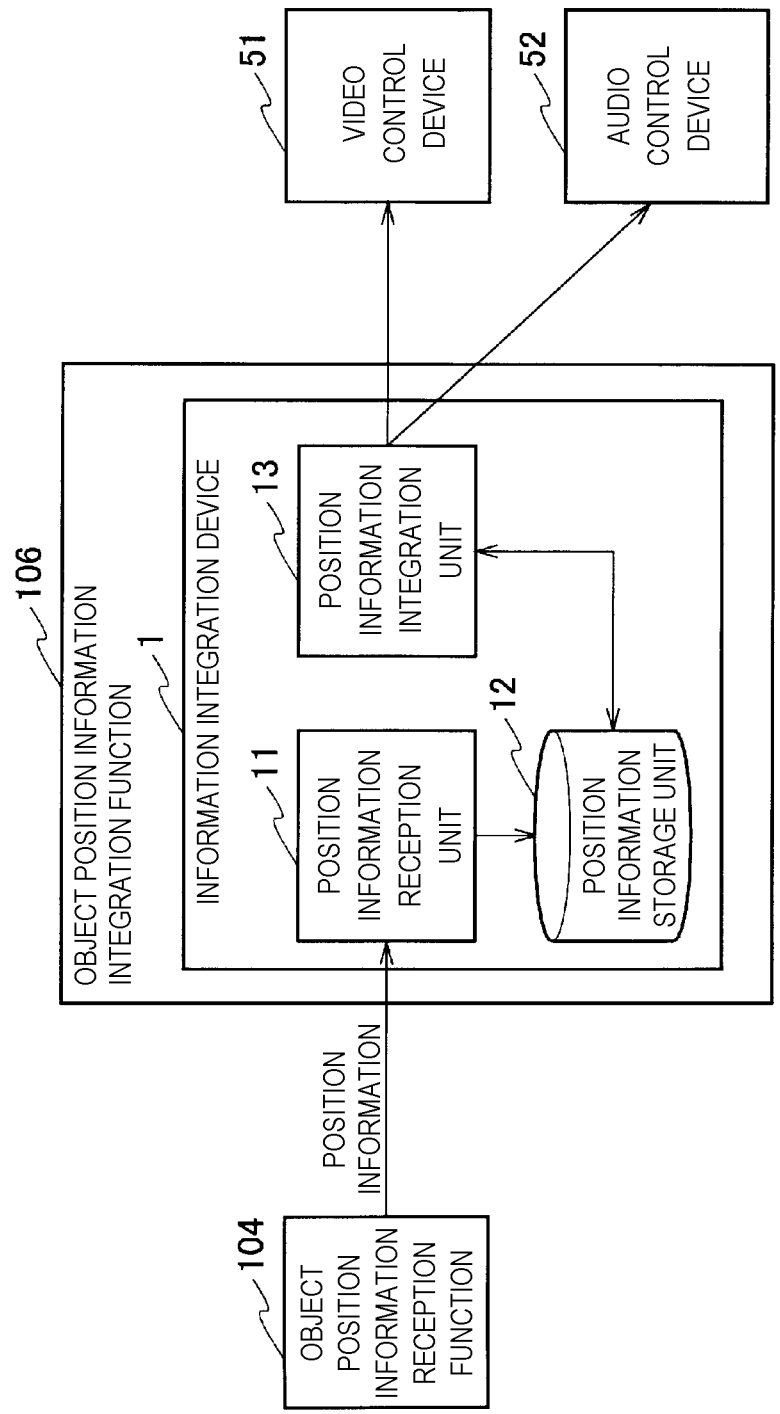
FIG. 2 is a diagram illustrating a functional example of an information integration device.

In this regard, in this embodiment, an information integration device 1 is mounted on the object position information integration function 106. FIG. 2 is a diagram illustrating an example of a functional block of the information integration device 1. The information integration device 1 includes a position information reception unit 11, a position information storage unit 12, and a position information integration unit 13. The information integration device 1 may be mounted on the object position information distribution function 101.

The position information reception unit 11 has a function of receiving the position information for each location on the areas of the objects which are measured by a plurality of sensors from a plurality of locations. Particularly, in this embodiment, regarding objects overlapping in any of the locations, the position information reception unit 11 receives the position information indicating the position of the areas of the objects, that is, the object area where occlusion occurs from each sensor.

The position information storage unit 12 has a function of storing the position information for each location received by the position information reception unit 11 to be readable.

As the first method, the position information integration unit 13 has a function of calculating the smallest rectangle surrounding the object as the rectangle surrounding the object by using the position information for each location.

As the second method, the position information integration unit 13 has a function of calculating the largest rectangle surrounding the object as the rectangle surrounding the object by using the position information of each location.

In a case where the smallest rectangle surrounding the object is calculated by using the first method, the position information integration unit 13 has a function of calculating the position coordinate for each location of the area of the object in a shared coordinate system and calculating, as the rectangle surrounding the object, the rectangle in which the minimum value of the values excluding the minimum value among a plurality of maximum values of the area of the object for each location is set as the maximum value of the object, and the maximum value of the values excluding the maximum value among a plurality of minimum values of the area of the object for each location is set as the minimum value of the object in coordinates of a predetermined axis.

As the third method, the position information integration unit 13 has a function of performing the first method of calculating the smallest rectangle surrounding the object and performing the second method of calculating the largest rectangle surrounding the object as the rectangle surrounding the object in a case where there is a conflict in a magnitude relation between the obtained maximum value and minimum value of the object (a function of shifting from the first method to the second method).

The position information integration unit 13 has a function of performing the second method of calculating the largest rectangle surrounding the object in a case where the sensor information is insufficient, such as the case of receiving the position information only in one location received and not receiving the position information in two or more locations, and in a case where the first method of calculating the smallest rectangle surrounding the object is not executed.

For example, the locations are not limited to four locations of east, west, north, and south and may be any two or more locations around the object. Further, the object may be viewed from a bird's-eye perspective, for example, from a position slightly obliquely upward when viewed from the central object.

The above-described information integration device 1 can be realized by a computer equipped with a CPU, a memory, an input/output interface, and the like. Further, an information integration program for causing a computer to function as the information integration device 1 and a storage medium for the information integration program can also be created.

<Operation (First Method) of Information Integration Device>

Figure 3:
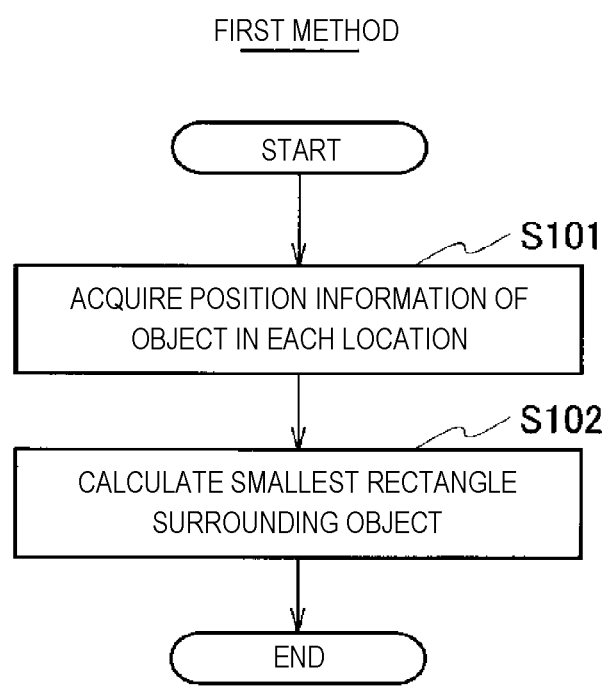
FIG. 3 is a diagram illustrating an example of a processing flow of a first method.

Next, the operation of the first method of the information integration device 1 will be described. The position information integration unit 13 integrates the position information received from each sensor to calculate (the position of the end point of) the smallest rectangle surrounding the object. As the position information to be input, arbitrary information can be used as long as the information is data that makes the position of each object seen from a certain direction identifiable. However, here, the case of using the Depth map is described as an example. Any data, such as tracking data, enabling expressing the two-dimensional or three-dimensional position coordinates of the object for each time may be used as well as the Depth map. FIG. 3 is a diagram illustrating the processing flow of the first method performed by the position information integration unit 13. The first method is a method of calculating the smallest rectangle surrounding the object.

Step S101;

First, the position information integration unit 13 reads the position information on the object area in each location from the position information storage unit 12 and calculates the position coordinate in the shared coordinate system corresponding to the width and depth information in each location by using the read position information in each location. Hereinafter, step S101 is described in detail.

For example, first, the position information integration unit 13 calculates the width (a horizontal width and a vertical width) of the object from the object area included in the Depth map (step S101a). Since the accuracy regarding the contour of the object area is high, the minimum value and the maximum value ($X_{min}$, $X_{max}$, $Y_{min}$, and $Y_{max}$ of the object outline area point group; X is a horizontal axis, Y is a vertical axis, in other words, the position coordinates of the end point of the object area) of the contour of the object area in a local coordinate system are acquired to be defined as the width of the object.

For example, next, the position information integration unit 13 calculates the depth of the object from the depth information of the Depth map or the depth information of the tracking data (step S101b). Since the depth information or the depth information has large variations in the object area, and high accuracy is not obtained as a use scene, only one value is acquired from the Depth map or tracking data to be defined as the depth to the object. For example, the most frequent value of the depth value is defined as the depth.

Herein, steps S101a and S101b are described. For example, a Z value (depth) is obtained from the maximum value and the minimum value of the depth value of the Depth map, and an X value (width) and a Y value (height) of the contour coordinate are calculated from the contour, depth and internal parameters of the Depth map (the maximum/minimum value system of the Depth map). At this time, as the Z value, the most frequent value of the depth value of the Depth map may be used (the most frequent value system of the Depth map). The maximum/minimum value system and the most frequent value system of the Depth map are selectable.

For example, the local coordinate system of the tracking data is used as the Z value (depth), and an X value (width) and a Y value (height) of a frame line coordinate is calculated from the contour, depth, internal parameters of the Depth map (tracking data depth system). Further, a value obtained by converting the local coordinate system into the global coordinate system for only tracking data, generating a centroid point from a rectangle, and performing time subsampling processing may be used (tracking through system). The tracking data depth system and the tracking through system are selectable.

After step S101b, the position information integration unit 13 converts the width and depth information of the local coordinate system calculated in steps S101a and S101b into the global coordinate system which is a common shared coordinate system in all locations (step S101c).

Accordingly, the position coordinates ($X_{i,min}$, $X_{i,max}$, $Y_{i,min}$, $Y_{i,max}$, $Z_{i,min}$, $Z_{i,max}$) of the area of the object in the global coordinate system are calculated. The subscript "i" is an identifier indicating each location.

Figure 4:
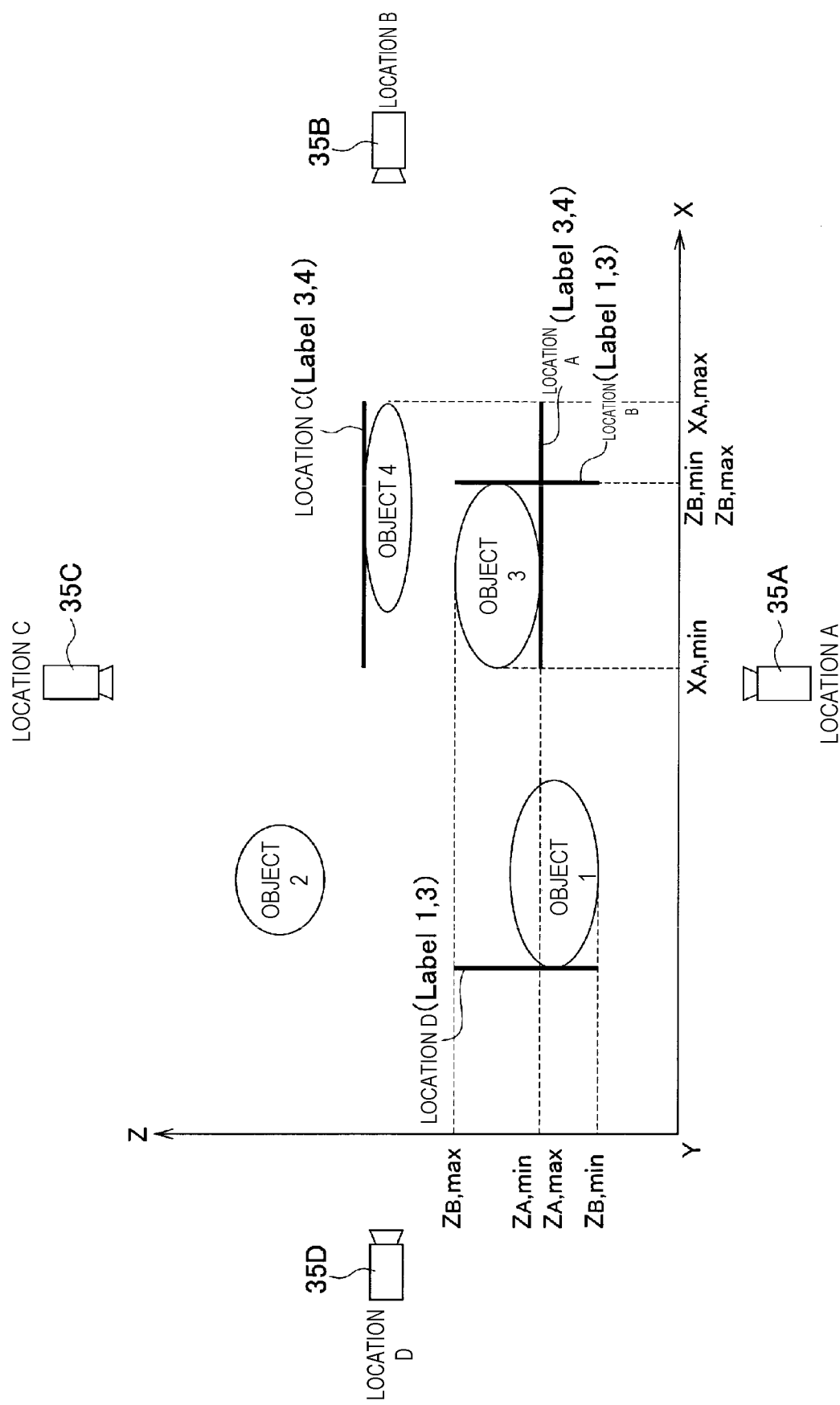
FIG. 4 is a diagram illustrating an example of the position coordinates of objects in a global coordinate system.

FIG. 4 is a diagram illustrating an example of the position coordinate of the object in the global coordinate system. In FIG. 4, a horizontal direction is defined as an X-axis, a vertical direction is defined as a Y-axis, and a depth direction is defined as a Z-axis. Four sensors 35A to 35D are installed in the east, west, north, and south sides for four objects 1 to 4. The label representing an object n seen from the sensors 35A to 35D is defined as Label n. In a case where a plurality of objects appear to overlap by occlusion, one label, such as Label m,n, corresponding to all the objects appearing to overlap is imparted to the overall object area appearing to overlap.

The object 3 is described as an example. When viewed from the sensor 35A on a location A, the object 3 appears to overlap with the object 4, and thus Label 3,4 is used. The left end of Label 3,4 is defined as $X_{A,min}$, and the right end of Label 3,4 is defined as $X_{A,max}$. In the depth direction, since only one value is acquired as described above, for example, the position of the nearest side of the object 3 when viewed from the sensor 35A is defined as $Z_{A,min}$ and $Z_{A,max}$.

When the object 3 is viewed from the sensor 35B on a location B, the object 3 appears to overlap with the object 1 and thus is defined as Label 1,3. The left end of Label 1,3 is defined as $Z_{B,min}$, and the right end of Label 1,3 is defined as $Z_{B,max}$. In the horizontal direction, the position of the nearest side of the object 3 when viewed from the sensor 35B is defined as $X_{B,min}$ and $X_{B,max}$.

In the case of calculating the position coordinate of the global coordinate system, the position information integration unit 13 may calculate the position coordinate by time sampling, for example, by using sensor information for only one of four frames instead of sensor information for all frames output from the sensor.

Step S102;

Next, the position information integration unit 13 calculates the smallest rectangle surrounding the object by using the position coordinate ($X_{i,min}$, $X_{i,max}$, $Y_{i,min}$, $Y_{i,max}$, $Z_{i,min}$, $Z_{i,max}$) of the object in the global coordinate system calculated in step S101. Hereinafter, step S102 is described in detail.

As the rectangles surrounding the objects 1 to 4, the smallest rectangle is calculated from the width and depth information of the object from each of the locations A to D in consideration of occlusion. Specifically, the position information integration unit 13 calculates the smallest rectangle ($X_{min}$, $X_{max}$, $Y_{min}$, $Y_{max}$, $Z_{min}$, $Z_{max}$) surrounding the object by Formulas (1) to (6).

$$X_{max} = \min(X \text{ excluding the minimum value in } X_{i,max}) \quad \text{Formula (1)}$$

$$X_{min} = \max(X \text{ excluding the maximum value in } X_{i,min}) \quad \text{Formula (2)}$$

$$Z_{max} = \min(Z \text{ excluding the minimum value in } Z_{i,max}) \quad \text{Formula (3)}$$

$$Z_{min} = \max(Z \text{ excluding the maximum value in } Z_{i,min}) \quad \text{Formula (4)}$$

$$Y_{max} = \min(Y_{i,max}) \quad \text{Formula (5)}$$

$$Y_{min} = \max(Y_{i,min}) \quad \text{Formula (6)}$$

Figure 5:
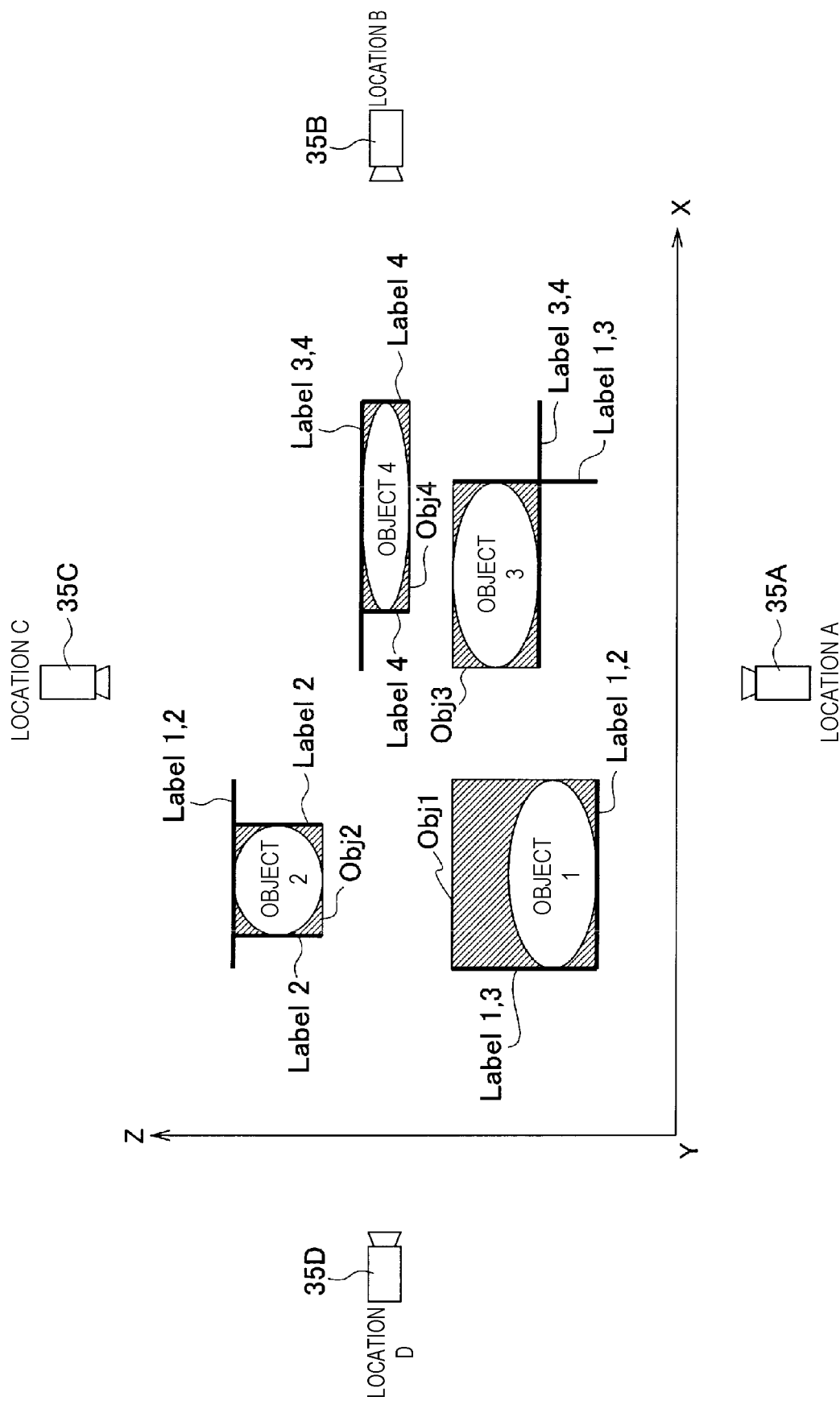
FIG. 5 is a diagram illustrating an example of calculation of a smallest rectangle.

Accordingly, smallest rectangles Obj1 to Obj4 surrounding respective objects 1 to 4 are calculated as illustrated in FIG. 5. Incidentally, as for the smallest rectangle Obj1 surrounding the object 1, the objects 1 and 3 are in an occlusion state, and there is no position information for identify the position of one side (upper side) of the object 1. Thus, the smallest rectangle Obj1 is calculated in a state where an extra space is included as a part of the object 1.

A method of calculating the smallest rectangle is described by using the object 3 as an example.

Figure 6:
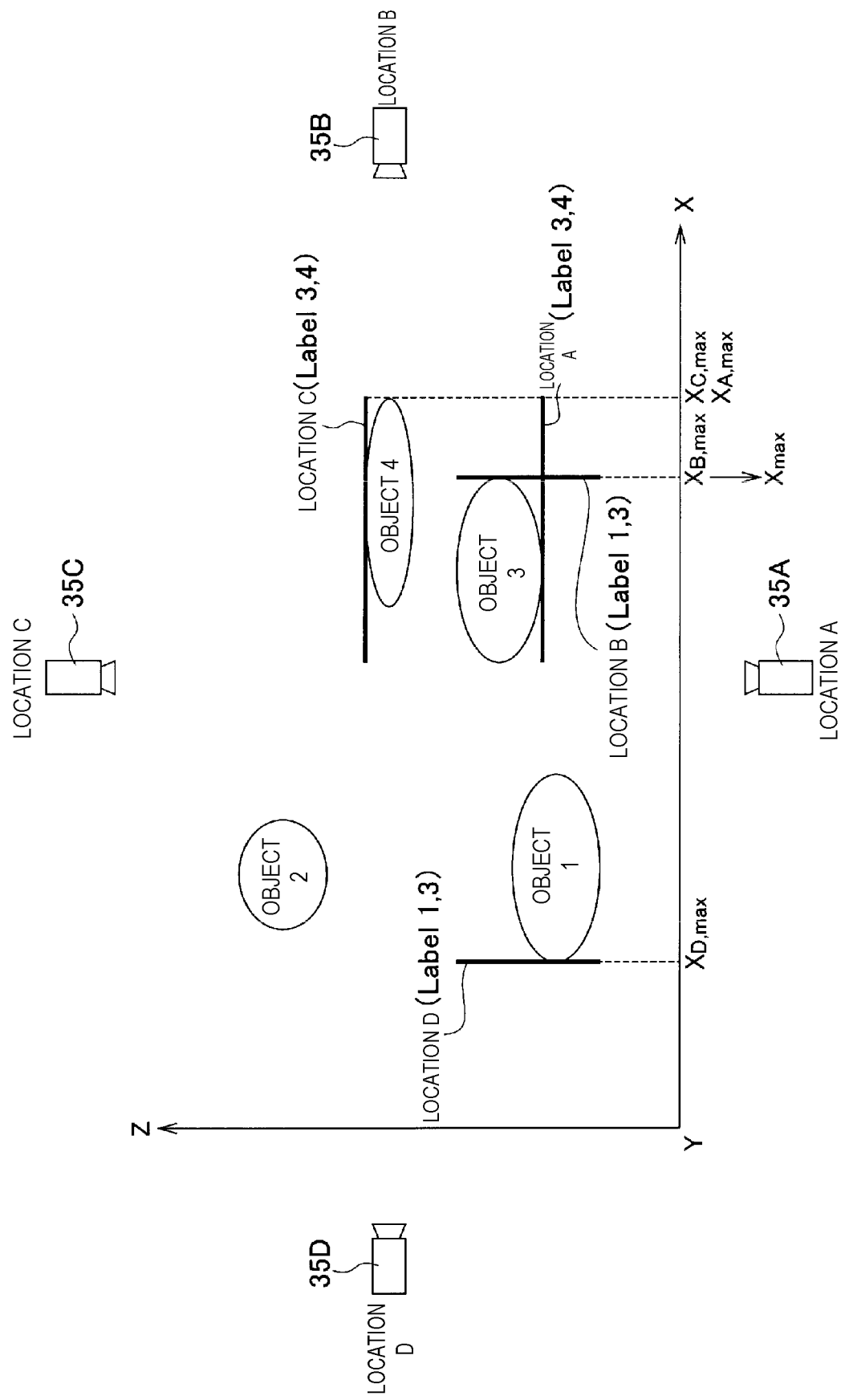
FIG. 6 is a reference diagram when $X_{max}$ of an object 3 is calculated.

As illustrated in FIG. 6, the right end of the location A (Label 3,4) when viewed from the sensor 35A on the location A is defined as $X_{A,max}$. The left end of the location C (Label 3,4) when viewed from the sensor 35C on the location C is defined as $X_{C,max}$. On the other hand, the position corresponding to the location B (Label 1,3) when viewed from the sensor 35B on the location B is defined as $X_{B,max}$. The position corresponding to the location D (Label 1,3) when viewed from the sensor 35D on the location D is defined as $X_{D,max}$. When these $X_{A,max}$, $X_{B,max}$, $X_{C,max}$, and $X_{D,max}$ are applied to Formula (1), $X_{B,max}$ which is the minimum value among the values excluding $X_{D,max}$ which is the minimum value is defined as $X_{max}$ of the object 3 in an X-axis direction.

Figure 7:
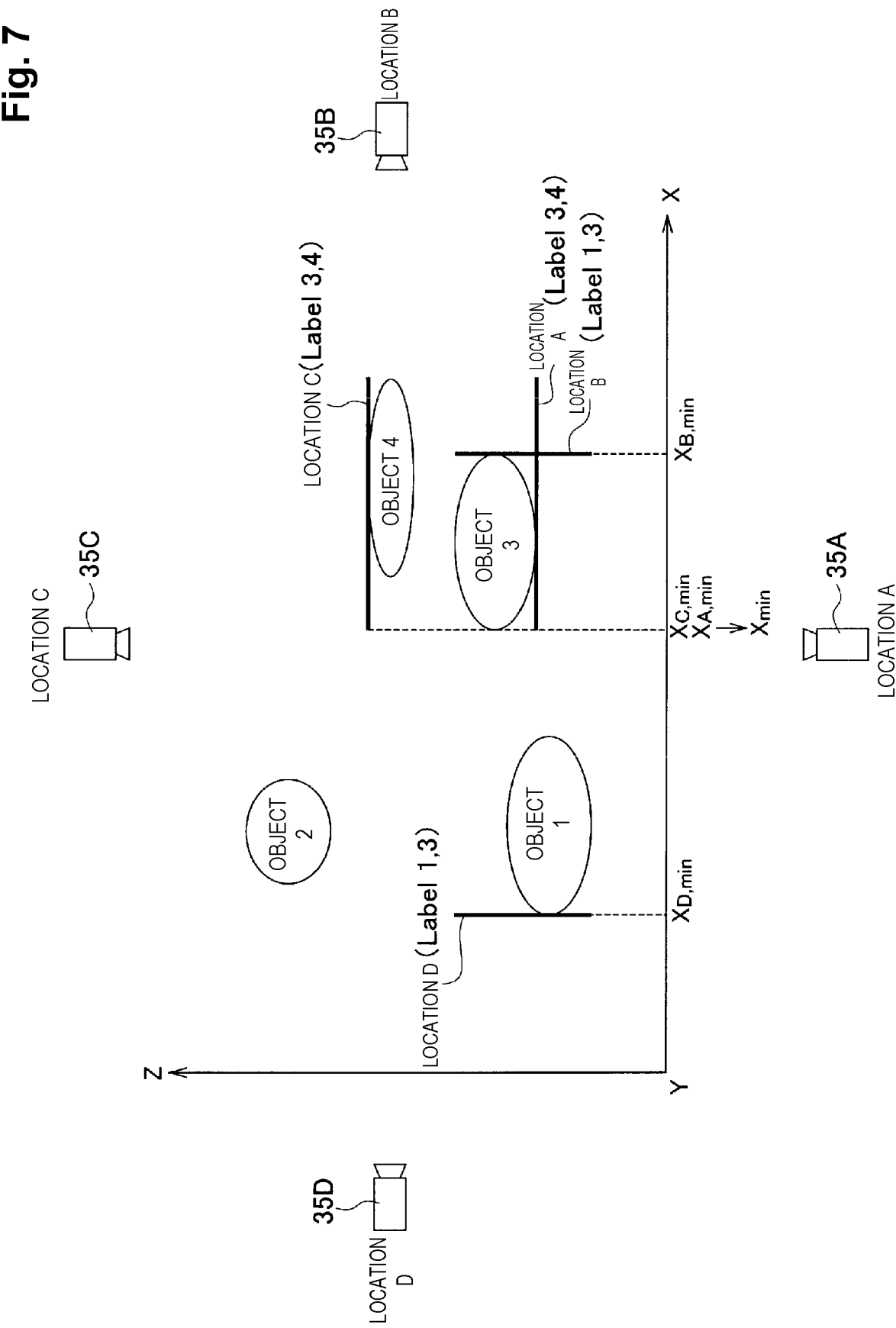
FIG. 7 is a reference diagram when $X_{min}$ of the object 3 is calculated.

As illustrated in FIG. 7, the left end of the location A (Label 3,4) when viewed from the sensor 35A on the location A is defined as $X_{A,min}$. The right end of the location C (Label 3,4) when viewed from the sensor 35C on the location C is defined as $X_{C,min}$. On the other hand, the position corresponding to the location B (Label 1,3) when viewed from the sensor 35B on the location B is defined as $X_{B,min}$. The position corresponding to the location D (Label 1,3) when viewed from the sensor 35D on the location D is defined as $X_{D,min}$. When these $X_{A,min}$, $X_{B,min}$, $X_{C,min}$, and $X_{D,min}$ are applied to Formula (2), $X_{A,min}$ or $X_{C,min}$ which is the maximum value among the values excluding $X_{B,min}$ which is the maximum value is defined as $X_{min}$ of the object 3 in the X-axis direction.

Similarly, $Z_{max}$ and $Z_{min}$ in a Z-axis direction are also calculated by using Formulas (3) and (4). As for $Y_{max}$ in a Y-axis direction, the minimum value in $Y_{A,max}$, $Y_{B,max}$, $Y_{C,max}$, and $Y_{D,max}$ is defined as $Y_{max}$ according to Formula (5). As for $Y_{min}$ in the Y-axis direction, the maximum value in $Y_{A,min}$, $Y_{B,min}$, $Y_{C,min}$, and $Y_{D,min}$ is defined as $Y_{min}$ according to Formula (6).

As a result, the smallest rectangle surrounding the object as much as possible is calculated for the object in which occlusion occurs. Incidentally, the reason for "excluding the minimum value" and "excluding the maximum value" in Formulas (1) to (4) is that $X_{i,max}$ or $X_{i,min}$ which is the smallest or largest X coordinate in the global coordinate system and is calculated by the sensor 35 is inappropriate for the rectangle of the object.

From the above, according to the first method, the smallest rectangle surrounding the object is calculated by using the width and depth information of the object in the locations A to D, and thus the objects appearing to overlap can be discriminated, and the object hidden behind can be expressed. As a result, the influence on the object expression performed by the video control device 51 and the audio control device 52 can be reduced.

<Operation (Second Method) of Information Integration Device>

Figure 8:
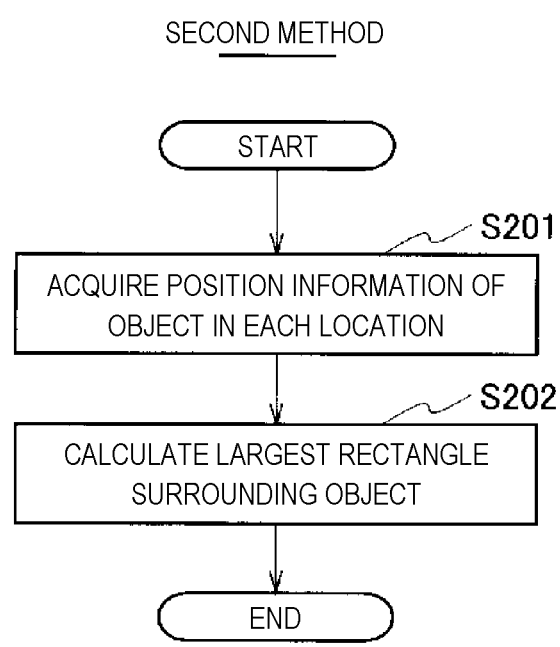
FIG. 8 is a diagram illustrating an example of a processing flow of a second method.

Next, the operation of the second method of the information integration device 1 will be described. FIG. 8 is a diagram illustrating a processing flow of the second method performed by the position information integration unit 13. The second method is a method of calculating the largest rectangle surrounding the object.

Step S201;

First, similarly to step S101, the position information integration unit 13 reads the position information on the object area in each location from the position information storage unit 12, and calculates the position coordinate in the global coordinate system corresponding to the width and depth information in each location by using the read position information in each location.

Step S202;

Next, the position information integration unit 13 calculates the largest rectangle surrounding the object by using the position coordinate ($X_{i,min}$, $X_{i,max}$, $Y_{i,min}$, $Y_{i,max}$, $Z_{i,min}$, $Z_{i,max}$) of the object in the global coordinate system calculated in step S201. Hereinafter, step S202 is described in detail.

As for the rectangles surrounding the objects 1 to 4, even in a case where an occlusion occurs, the largest rectangle is calculated from the width and depth information of the object on each of locations A to D without considering the occlusion. Specifically, the position information integration unit 13 calculates the largest rectangle ($X_{min}$, $X_{max}$, $Y_{min}$, $Y_{max}$, $Z_{min}$, $Z_{max}$) surrounding the object by using Formulas (7) to (12).

$$X_{max} = \max(X_{A,max}, X_{C,max}) \quad \text{Formula (7)}$$

$$X_{min} = \min(X_{A,min}, X_{C,min}) \quad \text{Formula (8)}$$

$$Z_{max} = \max(Z_{B,max}, Z_{D,max}) \quad \text{Formula (9)}$$

$$Z_{min} = \min(Z_{B,min}, Z_{D,min}) \quad \text{Formula (10)}$$

$$Y_{max} = \max(Y_{A,max}, Y_{B,max}, Y_{C,max}, Y_{D,max}) \quad \text{Formula (11)}$$

$$Y_{min} = \min(Y_{A,min}, Y_{B,min}, Y_{C,min}, Y_{D,min}) \quad \text{Formula (12)}$$

Figure 9:
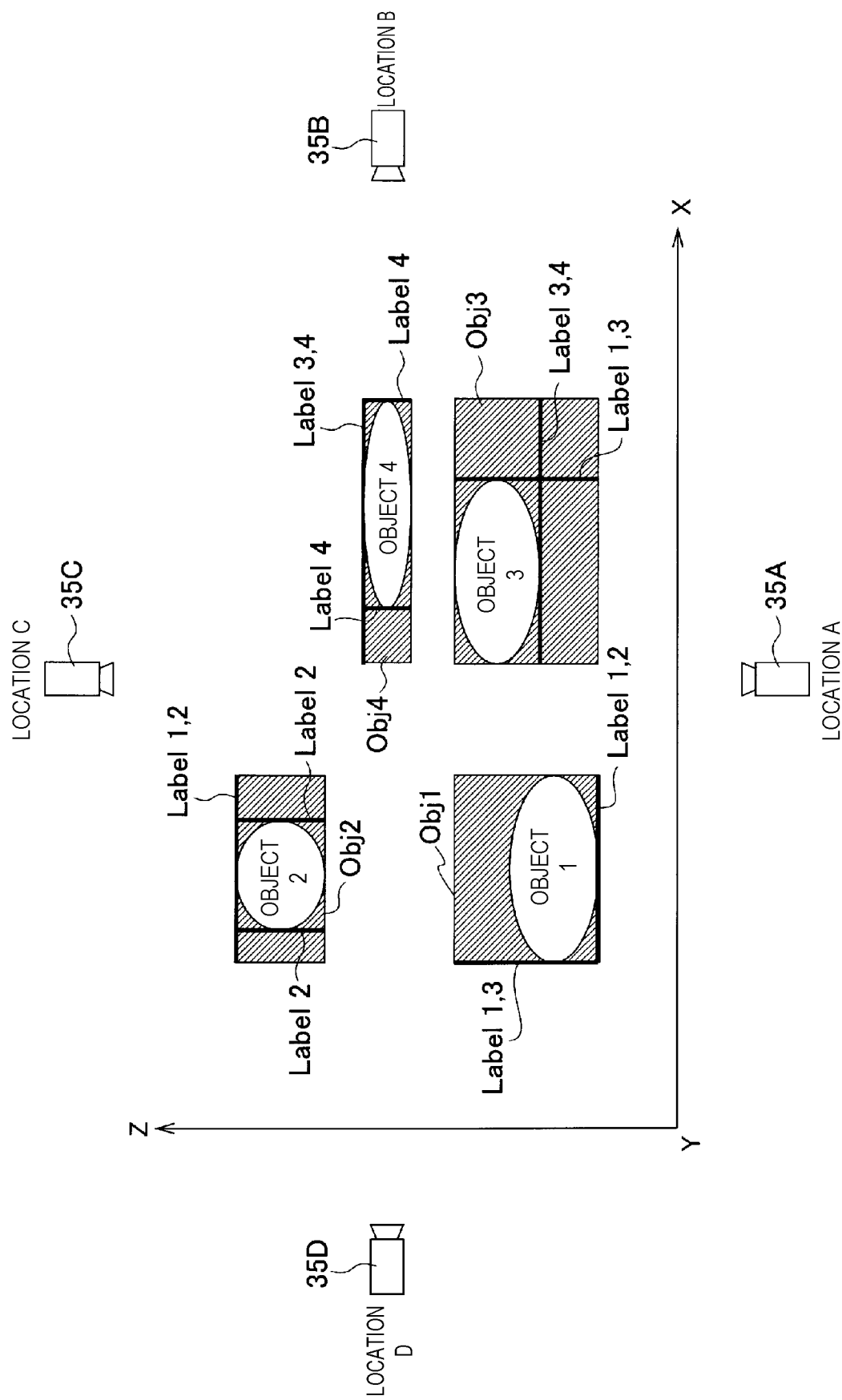
FIG. 9 is a diagram illustrating an example of calculation of a largest rectangle.

Accordingly, the largest rectangles Obj1 to Obj4 surrounding respective objects 1 to 4 are calculated as illustrated in FIG. 9.

A method of calculating the largest rectangle is described by using the object 3 as an example.

Figure 10:
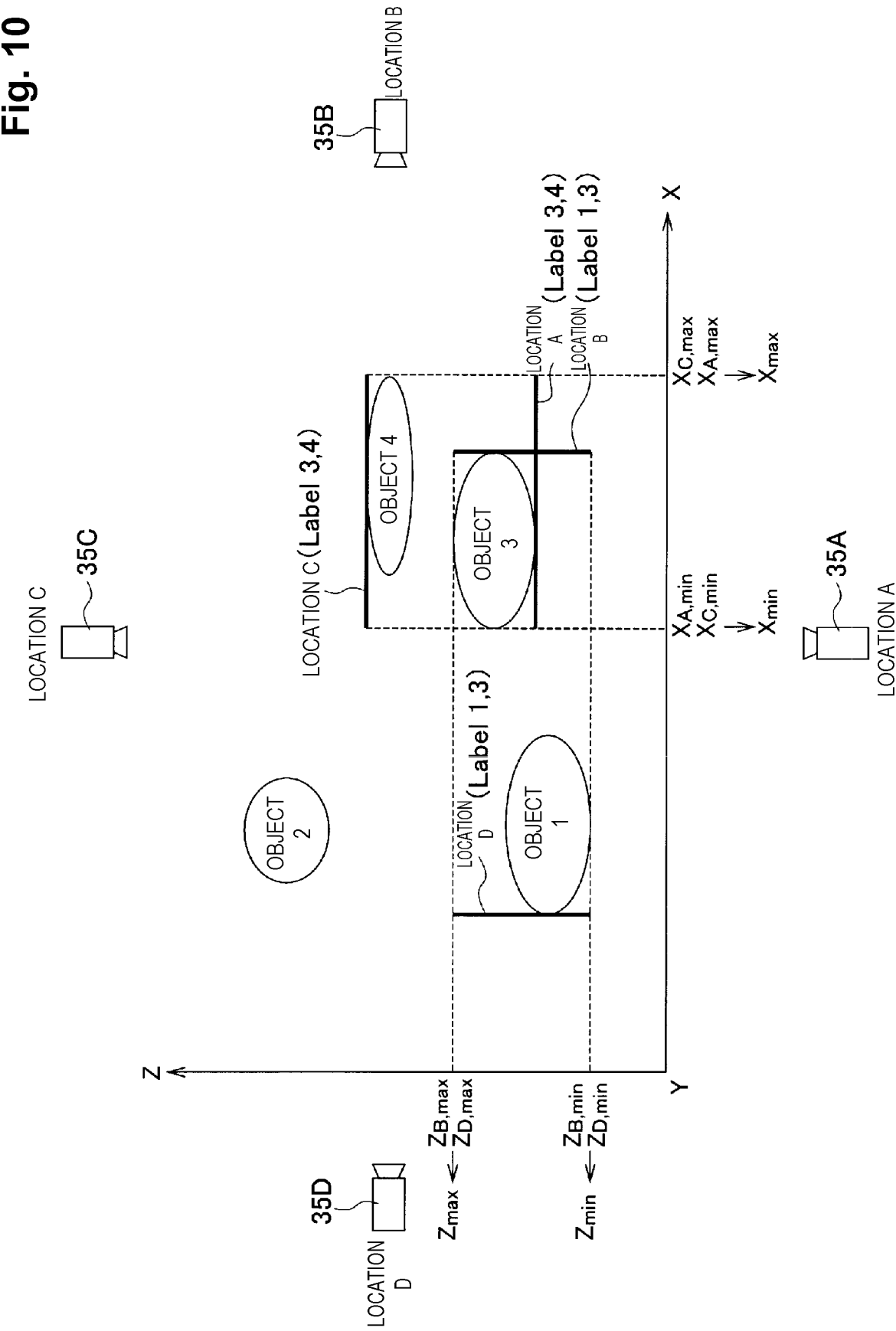
FIG. 10 is a reference diagram when the largest rectangle of the object 3 is calculated.

As illustrated in FIG. 10, the right end of the location A (Label 3,4) when viewed from the sensor 35A on the location A is defined as $X_{A,max}$. The left end of the location C (Label 3,4) when viewed from the sensor 35C on the location C is defined as $X_{C,max}$. When these $X_{A,max}$ and $X_{B,max}$ are applied to Formula (7), the maximum value among $X_{A,max}$ and $X_{C,max}$ is defined as $X_{max}$ of the object 3 in the X-axis direction.

As illustrated in FIG. 10, the left end of the location A (Label 3,4) when viewed from the sensor 35A on the location A is defined as $X_{A,min}$. The right end of the location C (Label 3,4) when viewed from the sensor 35C on the location C is defined as $X_{C,min}$. When these $X_{A,min}$ and $X_{B,min}$ are applied to Formula (8), the minimum value among $X_{A,min}$ and $X_{C,min}$ is defined as $X_{min}$ of the object 3 in the X-axis direction.

As illustrated in FIG. 10, when viewed from the sensor 35B on the location B, the right end of the location B (Label 1,3) is defined as $X_{B,max}$. When viewed from the sensor 35D on the location D, the left end of the location D (Label 1,3) is defined as $X_{D,max}$. When these $X_{B,max}$ and $X_{D,max}$ are applied to Formula (9), the maximum value among $X_{B,max}$ and $X_{D,max}$ is defined as $Z_{max}$ of the object 3 in the Z-axis direction.

As illustrated in FIG. 10, when viewed from the sensor 35B on the location B, the left end of the location B (Label 1,3) is defined as $X_{B,min}$. When viewed from the sensor 35D on the location D, the right end of the location D (Label 1,3) is defined as $X_{D,min}$. When these $X_{B,min}$ and $X_{D,min}$ are applied to Formula (10), the minimum value among $X_{B,min}$ and $X_{D,min}$ is defined as $Z_{min}$ of the object 3 in the Z-axis direction. Incidentally, FIG. 10 illustrates an example in which $X_{B,min}$ and $X_{D,min}$ match each other, for example. However, the overlapping degree of objects 1 and 3 viewed from each sensor differs depending on the positions of sensor 35B on the location B and sensor 35D on the location D, and thus, for example, in the case of $X_{B,min} < X_{D,min}$, it is satisfied that $Z_{min} = X_{B,min}$.

From the above, according to the second method, the largest rectangle surrounding the object is calculated by using the width and depth information of the object in the locations A to D, and thus the position information from the sensors of the locations A to D which are scattered with respect to one object is integrated uniquely as one rectangle, and individual objects can be easily discriminated. As a result, the influence on the object expression performed by the video control device 51 and the audio control device 52 can be reduced.

<Operation (Third Method) of Information Integration Device>

Figure 11:
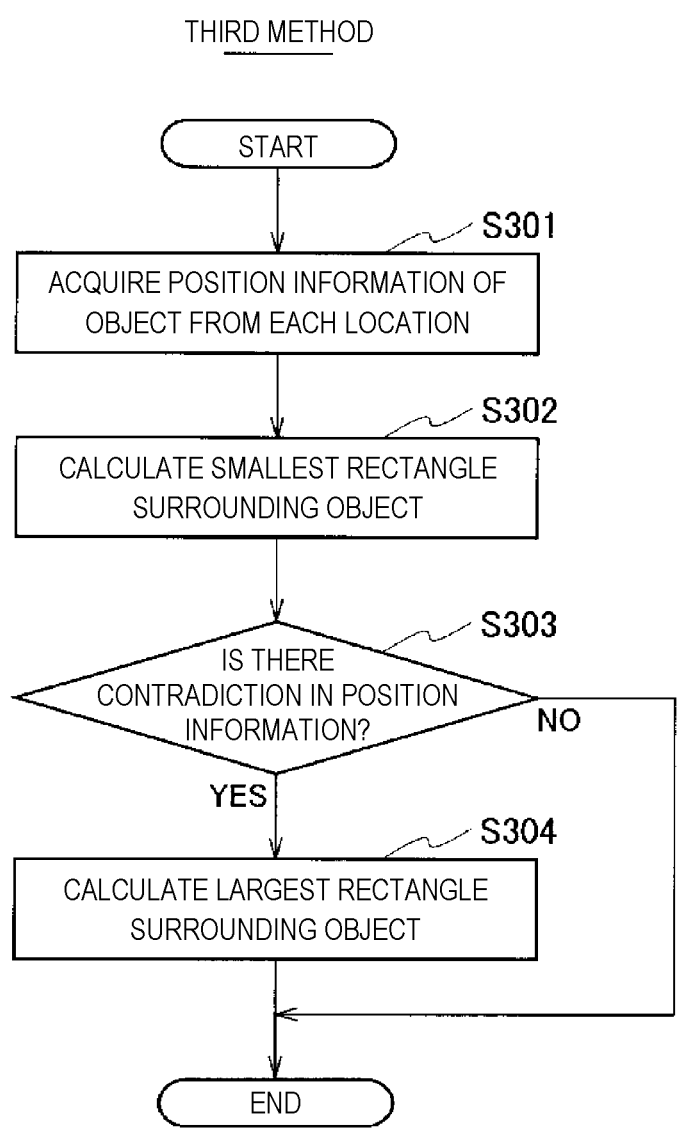
FIG. 11 is a diagram illustrating an example of a processing flow of a third method.
Figure 12:
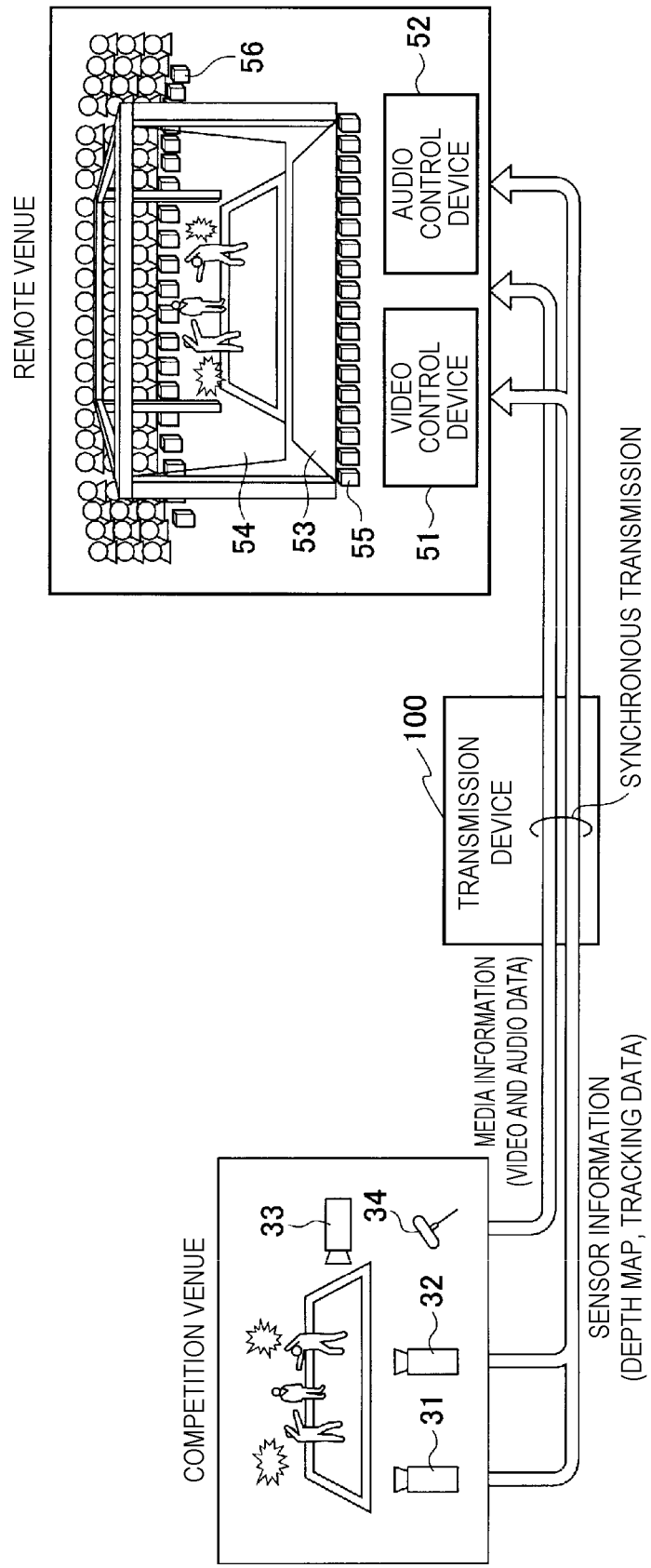
FIG. 12 is a diagram illustrating an image of synchronous transmission by the transmission device.
Figure 14:
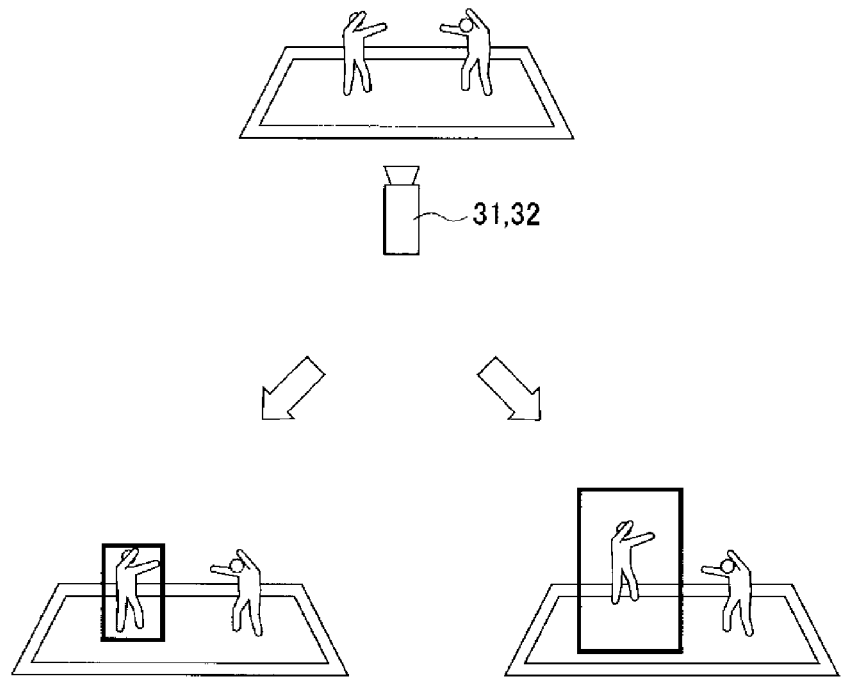
FIG. 14 is a reference diagram for explaining the problem.

Next, the operation of the third method of the information integration device 1 will be described. FIG. 11 is a diagram illustrating a processing flow of the third method performed by the position information integration unit 13. The third method is a method of usually calculating the smallest rectangle surrounding the object by using the first method and calculating the largest rectangle surrounding the object by using the second method in a case where the coordinate data of the object calculated by the first method includes contradictory data.

Step S301;

First, similarly to step S101, the position information integration unit 13 reads the position information on the object area in each location from the position information storage unit 12, and calculates the position coordinate in the global coordinate system corresponding to the width and depth information in each location by using the read position information in each location.

Step S302;

Next, similarly to step S101, the position information integration unit 13 calculates the smallest rectangle surrounding the object by using the position coordinate ($X_{i,min}$, $X_{i,max}$, $Y_{i,min}$, $Y_{i,max}$, $Z_{i,min}$, $Z_{i,max}$) of the object in the global coordinate system calculated in step S301.

Step S303;

Next, the position information integration unit 13 determines whether or not it is satisfied that $X_{min} > X_{max}$, $Y_{min} > Y_{max}$, or $Z_{min} > Z_{max}$ with reference to the position coordinate of the object calculated in step S302. In a case where even one of these inequalities is established, the process proceeds to step S304. On the other hand, in a case where all inequalities are not established, the process ends.

Step S304;

The position information integration unit 13 determines that a conflict occurs in the position coordinate of the object calculated in step S302, and calculates the largest rectangle surrounding the object.

In addition, in the case of receiving only position information in one location and not receiving the position information in two or more locations at the timing of step S301, the position information integration unit 13 may skip steps S302 and S303, and the process may proceed to step S304. Further, in a case where the first method is not designated in the setting file of the position information integration device 1, the position information integration unit 13 may calculate the position coordinate of the object by using the second method.

From the above, according to the third method, the smallest rectangle surrounding the object is usually calculated by using the first method, and the largest rectangle surrounding the object is calculated by using the second method in a case where the coordinate data of the object calculated by the first method includes contradictory data. Thus, the largest rectangle surrounding the object is calculated by at least the second method. Accordingly, the position information from the sensors of the locations A to D which are scattered with respect to one object is integrated uniquely as one rectangle, and individual objects can be easily discriminated. As a result, the influence on the object expression performed by the video control device 51 and the audio control device 52 can be reduced.

Effect

According to this embodiment, regarding the objects overlapping in any of the locations, the smallest rectangles surrounding the objects are calculated by using the position information on the areas of the objects in each location. Accordingly, the objects appearing to overlap can be discriminated, the object hidden behind can be expressed, and the influence on the object expression can be reduced.

According to this embodiment, regarding the objects overlapping in any of the locations, the largest rectangles surrounding the objects are calculated by using the position information on the areas of the objects in each location. Accordingly, the position information from the sensors of the locations which are scattered with respect to one object is integrated uniquely as one rectangle. For this reason, individual objects can be easily discriminated, and the influence on the object expression can be reduced.

According to this embodiment, the first method is performed which calculates the smallest rectangle surrounding the object and the largest rectangle is calculated in a case where there is a conflict in a magnitude relation between the obtained maximum value and minimum value of the object. Accordingly, the largest rectangle surrounding the object is calculated by at least the second method, and thus the position information from the sensors of the locations which are scattered with respect to one object is integrated uniquely as one rectangle. For this reason, individual objects can be easily discriminated, and the influence on the object expression can be reduced.

REFERENCE SIGNS LIST

1 Information integration device
11 Position information reception unit
12 Position information storage unit
13 Position information integration unit
31 Depth-of-field measuring sensor
32 Position information tracking sensor
33 Imaging device
34 Sound collection device
51 Video control device
52 Audio control device
53 Naked eye 3D display screen
54 Virtual image display panel
55 Wavefront synthesis speaker array (for competition sound)
56 Wavefront synthesis speaker array (for cheer sound)
100 Transmission device
101 Object position information distribution function
102 Media information encoding function
103 Position information/media information binding management function
104 Object position information reception function
105 Media information decoding function
106 Object position information integration function

The invention claimed is:

1. A three-dimensional (3D) media presentation method performed by a 3D media presentation system, the method comprising:
receiving, regarding objects which are measured by a plurality of sensors from a plurality of locations and overlap in any of the locations, position information for each location on areas of the objects;
obtaining media data comprising video data and audio data;
generating object position information comprising smallest rectangles or largest rectangles surrounding the objects as rectangles surrounding the objects by using the position information for each location, wherein calculating a smallest rectangle comprises: computing a position coordinate for each location of the area of the object in a shared coordinate system, and calculating the smallest rectangle in which a minimum value of values excluding a minimum value among a plurality of maximum values of the area of the object for each location is set as a maximum value of the object, and a maximum value of values excluding a maximum value among a plurality of minimum values of the area of the object for each location is set as a minimum value of the object in coordinates of a predetermined axis;
generating synchronized media data by synchronizing the media data and the object position information using time information;
controlling a 3D display screen to display a 3D video using the synchronized media data; and
controlling one or more wavefront synthesis speaker arrays to output a 3D audio signal using the synchronized media data.

2. The 3D media presentation method according to claim 1, wherein
the largest rectangle is calculated as a rectangle surrounding the object in a case where there is a conflict in a magnitude relation between the obtained maximum value and minimum value of the object.

3. The 3D media presentation method according to claim 1, wherein
the plurality of locations include a location viewing the object in a bird's-eye perspective.

4. A three-dimensional (3D) media presentation system comprising one or more processors configured to execute computer instructions to perform:
receiving, regarding objects which are measured by a plurality of sensors from a plurality of locations and overlap in any of the locations, position information for each location on areas of the objects;
obtaining media data comprising video data and audio data;
generating object position information comprising smallest rectangles or largest rectangles surrounding the objects as rectangles surrounding the objects by using the position information for each location, wherein calculating a smallest rectangle comprises: computing a position coordinate for each location of the area of the object in a shared coordinate system, and calculating the smallest rectangle in which a minimum value of values excluding a minimum value among a plurality of maximum values of the area of the object for each location is set as a maximum value of the object, and a maximum value of values excluding a maximum value among a plurality of minimum values of the area of the object for each location is set as a minimum value of the object in coordinates of a predetermined axis;
generating synchronized media data by synchronizing the media data and the object position information using time information;
controlling a 3D display screen to display a 3D video using the synchronized media data; and
controlling one or more wavefront synthesis speaker arrays to output a 3D audio signal using the synchronized media data.

5. The 3D media presentation system according to claim 4, wherein the largest rectangle as a rectangle surrounding the object in a case where there is a conflict in a magnitude relation between the maximum value and minimum value of the object.

6. The 3D media presentation system according to claim 4, wherein:
the plurality of locations include a location viewing the object in a bird's-eye perspective.

7. A non-transitory computer readable medium storing one or more instructions causing a computer to perform:
receiving, regarding objects which are measured by a plurality of sensors from a plurality of locations and overlap in any of the locations, position information for each location on areas of the objects;

obtaining media data comprising video data and audio data;

generating object position information comprising smallest rectangles or largest rectangles surrounding the objects as rectangles surrounding the objects by using the position information for each location, wherein calculating a smallest rectangle comprises: computing a position coordinate for each location of the area of the object in a shared coordinate system, and calculating the smallest rectangle in which a minimum value of values excluding a minimum value among a plurality of maximum values of the area of the object for each location is set as a maximum value of the object, and a maximum value of values excluding a maximum value among a plurality of minimum values of the area of the object for each location is set as a minimum value of the object in coordinates of a predetermined axis;

generating synchronized media data by synchronizing the media data and the object position information using time information;

controlling a 3D display screen to display a 3D video using the synchronized media data; and controlling one or more wavefront synthesis speaker arrays to output a 3D audio signal using the synchronized media data.

8. The non-transitory computer readable medium according to claim 7, wherein the one or more instructions further cause the computer to execute:

calculating the largest rectangle as a rectangle surrounding the object in a case where there is a conflict in a magnitude relation between the maximum value and minimum value of the obj ect.

9. The non-transitory computer readable medium according to claim 7, wherein the one or more instructions further cause the computer to execute:

receiving the plurality of locations including a location viewing the object in a bird's-eye perspective.

* * * * *